(12) United States Patent
Volfkovich et al.

(10) Patent No.: US 6,466,429 B1
(45) Date of Patent: Oct. 15, 2002

(54) ELECTRIC DOUBLE LAYER CAPACITOR

(75) Inventors: Yuri M. Volfkovich, Moscow Region (RU); Pavel A. Shmatko, Moscow Region (RU)

(73) Assignee: C and T Co., Inc., Ontario (CA)

( * ) Notice: Subject to any disclaimer, the term of this patent is extended or adjusted under 35 U.S.C. 154(b) by 0 days.

(21) Appl. No.: 09/848,724

(22) Filed: May 3, 2001

(51) Int. Cl.$^7$ ................................................. H01G 9/00
(52) U.S. Cl. ....................................... 361/502; 361/503
(58) Field of Search ................................. 361/502, 503, 361/508–511

(56) References Cited

U.S. PATENT DOCUMENTS 4,888,666 * 12/1989 Naitoh et al. ............... 361/512
6,115,235 * 9/2000 Naito ........................... 361/303

* cited by examiner

Primary Examiner—Dean A. Reichard
Assistant Examiner—Eric W. Thomas
(74) Attorney, Agent, or Firm—Kilpatrick Stockton LLP

(57) ABSTRACT

The present invention is directed to a novel capacitor. The capacitor may be used in electric double layer capacitors. The capacitors include a polarizable electrode including activated carbon and a non-polarizable electrode including lead dioxide and lead sulfate. The capacitors of the present invention provide considerably higher electric capacity, higher durability, and low resistance, while maintaining high conductivity. Additionally, the electrodes may be produced more quickly and inexpensively.

8 Claims, 3 Drawing Sheets

Fig_1

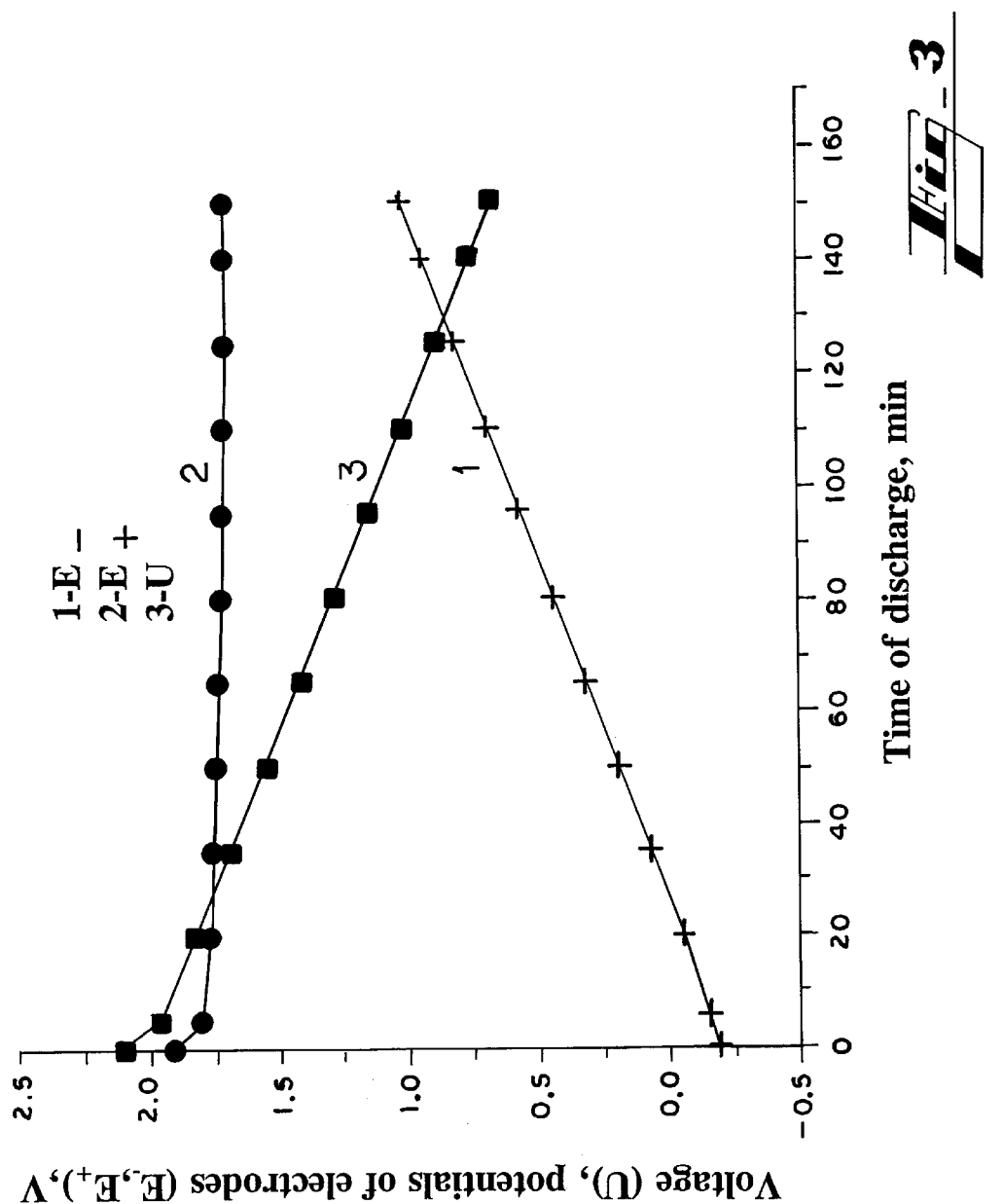

ELECTRIC DOUBLE LAYER CAPACITOR

TECHNICAL FIELD OF THE INVENTION

This invention relates to electrical engineering and to capacitor engineering in particular, and can be used for manufacturing of high capacitance capacitors utilizing the energy of the electric double layer (EDL). EDL capacitors have found their use as backup power sources in systems requiring uninterrupted electric power supply, such as computers, communication devices, digital programmable lathes, continuous production cycles; for electric starting of internal combustion engines, powering the engines of wheelchairs, golf carts, etc.

DESCRIPTION OF THE PRIOR ART

Several electric power storage devices exist in the form of electric double layer (EDL) capacitors, for example, as described in U.S. Pat. No. 4,313,084 and U.S. Pat. No. 4,562,511. Such capacitors include two porous polarizable electrodes with a porous separator made of a dielectric material between them and current collectors. A liquid electrolyte, which can be either non-aqueous or aqueous, including an aqueous sulfuric acid solution, is retained in the pores of the electrodes and the separator and in the free volume inside the capacitor case. The electric charge is accumulated in the pores on the interface between the electrode material and the electrolyte. Various porous carbon materials are normally used for manufacturing of polarizable electrodes. To increase the capacitance of the electric double layer capacitor, these carbon materials are subjected to prior activation for the purpose of increasing their specific surface area up to 300–3000 $m^2/g$.

EDL capacitors have much higher capacitance than conventional electrostatic and electrolytic capacitors—up to tens or hundreds of farads per gram of active electrode material. However, a disadvantage of these capacitors is their rather low specific energy, not exceeding 3 Wh/l. This maximum value of specific energy for double-layer capacitors is set with non-aqueous electrolytes, where the maximum voltage values are in the range of 3 to 3.5 V. However, such capacitors permit very low discharge and charge currents due to the very low conductivity of non-aqueous electrolytes. Still lower specific energies, 0.5 to 2 Wh/l, have been achieved by double-layer capacitors using aqueous electrolytes with maximum voltage value of approximately 0.9 V. When such double-layer capacitors remain under charge for a prolonged period of time (which is often quite long) at voltages higher than 0.9 V, noticeable oxidation of the positive carbon electrode takes place.

An electric double layer capacitor having only one polarizable electrode made of a carbon material, is described in Patent of Japan, Accepted Application No. 2-11008. The other electrode is a non-polarizable (i.e., storage) one, made of lithium or lithium alloy, the electrolyte being nonaqueous. Such a capacitor has higher specific energy compared to the conventional double-layer capacitor with two polarizable electrodes. However, a drawback of this prototype is the very low practical charge and discharge current (0.1 to 1 $mA/cm^2$) and, therefore, very low power density as a result of using a non-aqueous electrolyte. Another essential disadvantage of all rechargeable lithium devices, including the one in question, is the very low cyclability—about 100–200 cycles.

An EDL capacitor with only one polarizable electrode made of a fibrous carbon material is described in Patent WO 97/07518. The other electrode, made of nickel oxide, is non-polarizable. An aqueous solution of alkaline metal carbonate or hydroxide is used as electrolyte. Such a capacitor excels considerably the double-layer capacitors with two polarized electrodes in both specific energy (up to 12.5 Wh/l) and maximum voltage (1.4 V).

However, such a capacitor has a number of shortcomings: 1) Insufficiently high specific energy; and 2) High cost, due to the use of large amounts of nickel oxide.

From technological point of view and as effect achieved, closest to the present invention are EDL capacitors employing lead compounds as active ingredients of the non-polarizable electrode, which are disclosed in PCT/RU97/00353 and PCT/RU97/00411. In particular, lead dioxide is used in the case of PCT/RU97/00353 and lead sulfate in the case of PCT/RU97/00411. The device disclosed in PCT/RU97/00353 is considered as a prototype of the invention herein.

Still another drawback of the EDL capacitors is the gas generation on the electrodes at overcharge, e.g. of oxygen on the positive electrode and/or hydrogen on the negative electrode. This occurs when the evolution potentials of these gases on the corresponding electrodes are reached at overcharge. As a result, the pressure within the capacitor case increases, which can lead to its decompression and even explosion, unless it is equipped with a special pressure relief valve. But even such valves often are not reliable enough to prevent decompression or explosion: they can, for instance, become clogged with dirt, etc. On account of all this, EDL capacitors have a fundamental disadvantage: the possibility of their decompression and even explosion and need of special maintenance. In order to prevent decompression, the end-of-charge voltage is significantly reduced for reinsurance, thus reducing the initial discharge voltage as well. This, in its turn, leads to a considerable decrease in the EDL capacitor specific energy, which is directly proportional to the difference between the squares of the initial and final discharge voltages.

SUMMARY OF THE INVENTION

The objects of the present invention are to increase the specific energy of the capacitor and to reduce its cost.

Both of these objects are achieved by the invention described below. In accordance with the invention, a capacitor is provided, which comprises a polarizable electrode made of a porous carbon material, a nonpolarizable electrode made of a material including lead sulfate and lead dioxide as active components, and an aqueous solution of sulfuric acid as electrolyte. The polarizable carbon electrode is negative, and the $PbO_2/PbSO_4$ electrode positive.

The preferable mass ratio of the lead sulfate to the lead dioxide ranges from about 0.1 to 99% to about 99 to 0.1%.

The following electrochemical reaction takes place during discharge and charge on the positive electrode:

$$PbO_2 + HSO_4^- + 3H^+ + 2e \rightleftharpoons PbSO_4 + 2H_2O \tag{1}$$

Under the working conditions employed, the maximum equilibrium potential of this reversible reaction in the charged state is approximately 1.8 V.

During cycling, the EDL on the negative electrode is recharged. The charge-discharge process of the EDL can be described as follows:

$$(H^+)_{ad}/e + HSO_4^- \rightleftharpoons H^+ + (HSO_4^-)_{ad}/-e + 2e^- \tag{2}$$

Here the designation $(H^+)_{ad}/e$ refers to a proton adsorbed in the EDL on the negatively charged surface of the carbon electrode (for charged state of the capacitor), and $(HSO_4^-)_{ad}/-e$ to the bisulfate ion adsorbed in the EDL on the positively charged surface of the carbon electrode (for discharged state of the capacitor). In our experiments, the potential of said electrode changed in the range of $-0.2$ to $1.0$ V vs. normal hydrogen electrode in the same solution.

Combining reactions (1) and (2) give the overall equation of the electrochemical reaction taking place in the electrical double layer capacitor, described herein:

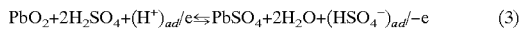
$$PbO_2+2H_2SO_4+(H^+)_{ad}/e \leftrightharpoons PbSO_4+2H_2O+(HSO_4^-)_{ad}/-e \qquad (3)$$

It should be noted that the active mass of the positive electrode contains both lead dioxide and lead sulfate at any degree of discharge. This has been demonstrated by the results of the chemical analysis. As such, at fully charged state the actual mass ratio of $PbSO_4$ to $PbO_2$ is generally not lower than about 0.1% $PbSO_4$ to about 99% $PbO_2$, while at fully discharged state it is generally not higher than about 99% $PbSO_4$ to about 0.1% $PbO_2$.

An essential characteristic of the capacitor in accordance with the present invention is the effect of the lead electrode on the surface condition and characteristics of the activated carbon electrode. It is caused by transfer of lead from the positive electrode to the negative one at 500 to 2000 mg/cm$^2$ (as determined the methods of inductively coupled plasma, atomic absorption and spectral analysis). As a result, the specific capacitance of the activated carbon electrodes increases by 150–300 F/g.

In a preferred embodiment a capacitor cell or capacitor battery stack is compressed between the power covers of the housing. This significantly reduces the capacitor internal resistance, especially when using negative electrodes made of carbon fabric or felt, and prevents shedding of the active mass of the positive electrode, which is one of the factors limiting the cycle life of EDL capacitors.

The technological approaches described above provide significant increase in the specific energy of the capacitor, reducing its cost at the same time. Increase in specific energy is achieved by rise of the initial discharge voltage up to about 2.0–2.1 V, as well as by a 50% increase in the conductivity of the sulfuric acid electrolyte in comparison with an alkaline one. The cost of the EDL capacitor manufactured according to the present invention is reduced due to use of lead sulfate and lead dioxide electrode, which are considerably cheaper than nickel oxide.

One of the goals of the present invention is to provide completely sealed and maintenance-free capacitor. This is achieved by establishing in the capacitor a system of interconnected gas pores in both electrodes and the separator. The following technological approaches have been proposed:

The volume of the electrolyte in the capacitor is lower than the total pore volume in the electrodes and the separator.

The electrolyte-free portion of pore volume in the electrodes and the separator is in the range of 10 to 50%.

The internal space of the capacitor is under vacuum.

The technological approaches described above allow the oxygen evolved on the positive electrode at end of charge and overcharge to be fully consumed on the negative electrode. The ionization (electroreduction) reaction is favored by both its extremely high polarization ($E_p>1$ V) and excellent catalytic ability of the activated carbon for this process. On the other hand, gaseous hydrogen, which can be evolved on the negative (carbon) electrode at overcharge can also in principle be fully consumed on the positive electrode by ionization (electrooxidation) reaction as a result of the extremely high polarization of this reaction ($E_p>1$ V).

The gas pore system assures very fast transport of the gaseous oxygen and hydrogen generated at charge and overcharge to the opposite electrodes, where their ionization takes place. This fast transport within the gas pore system is guaranteed by gas diffusion coefficient in gaseous phase, which is by 3 to 4 orders of magnitude higher than the corresponding diffusion coefficients for gases dissolved in a liquid electrolyte, and by filtration transport mechanism, which is still much faster than the diffusion one.

Thus, the invention presented herein provides a several-times increase in the specific capacitance and about 10 times reduction of the cost in comparison to the EDL capacitor known in WO 97/07518. The capacitor disclosed herein allows both series and parallel element connections and thus assembly of various capacitor batteries on its basis.

Furthermore, using the invention described herein, a completely sealed and maintenance-free capacitor can be assembled. With the possibility of decompression excluded, the end-of-charge value, and by this means the specific energy, could raise. Sealed design also permits considerable increase of the charge current and, therefore, corresponding decrease in the charge time, which is critical for many practical applications. Another beneficial consequence of the technological approach proposed herein, namely, the electrolyte being hold only in a part of the pore volume of the electrodes and the separator and absence of any free electrolyte, is that performance and working characteristics of EDL capacitor become independent of its position in space—horizontal, vertical, etc. By the same token, such a capacitor should function normally in objects moving at high accelerations, such as automobiles, aircraft, spacecraft, etc.

BRIEF DESCRIPTION OF THE DRAWINGS

FIG. 3 illustrates the dependence between the voltage (U) on the capacitor terminals and the potentials of the negative ($E_-$) and positive ($E_+$) electrode of the discharge time.

The numbers on the Figures designate the following features: 1—pressure cover of the capacitor case; 2—insulator; 3—metal current collector; 4—the current collector protective layer made of graphite foil; 5—negative polarizable porous carbon electrode soaked with electrolyte; 6—electron nonconductive separator soaked with electrolyte; 7—positive electrode made of lead sulfate and lead dioxide soaked with electrolyte; 8—acid-resistant sealant; 9—pressure-resistant case.

EXAMPLES

Example 1

Figure 1:
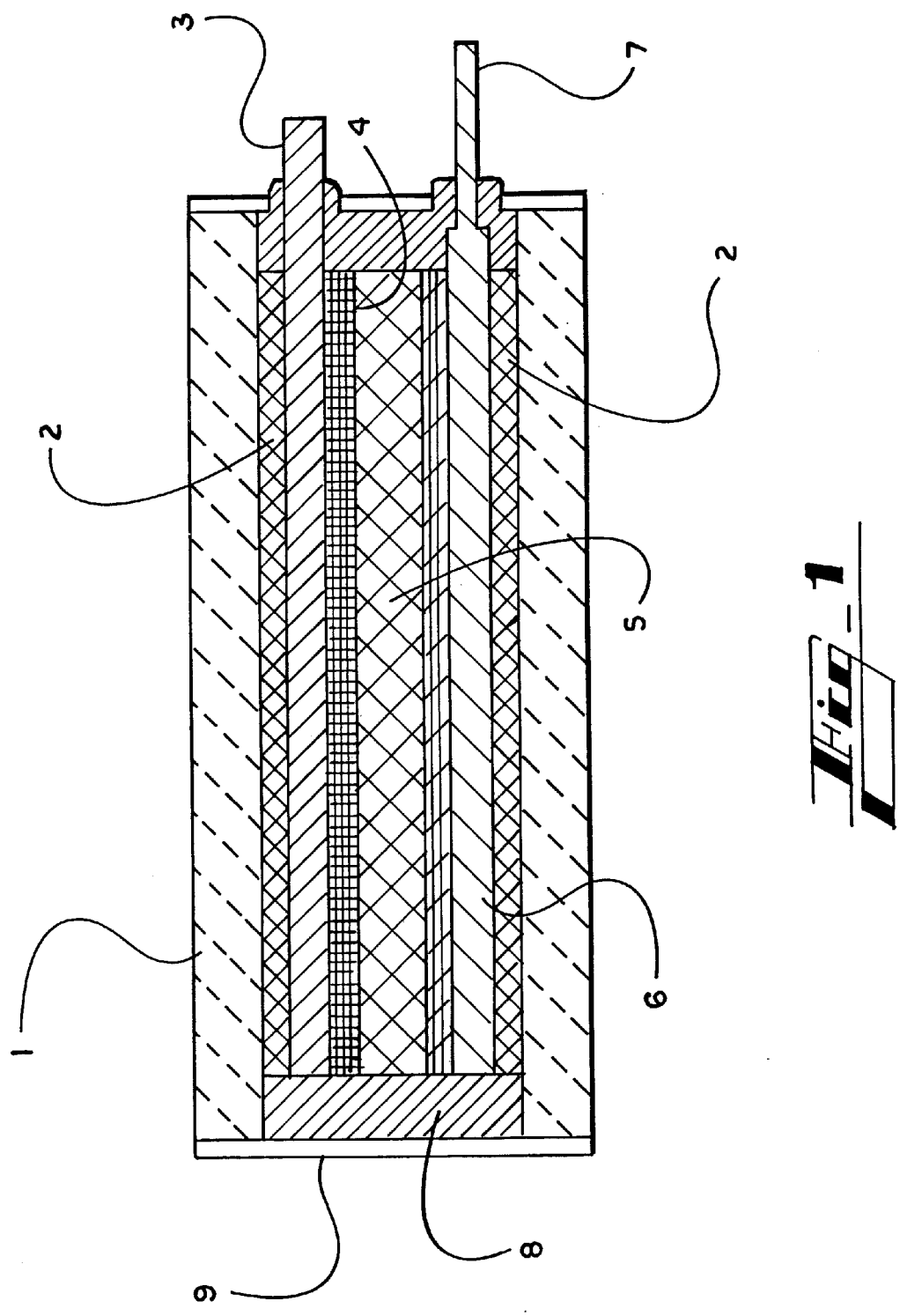
FIG. 1 represents a version of a capacitor assembled in accordance with the present invention.

An electric double layer capacitor (FIG. 1), comprising a negative electrode 5 in the form of 8 layers of activated carbon fabric of the TCA type having specific surface area of 1200 m$^2$/g and thickness of 300 $\mu$m each; a 1-mm-thick positive electrode 7, with active mass containing lead sulfate and lead dioxide, pressed into a grid made of an alloy containing 94% lead and 5% antimony; a Grace-type porous separator 6; a pressure cover of the case 1; an insulator 2 preventing short-circuiting between the capacitor electrodes; a current collectors 3 made of sheet steel; a current collectors protective corrosion-resistant layer 4 made of graphite foil; an acid-resistant sealant 8; and a pressure-resistant case 9.

According to the chemical analysis, the active mass of the positive electrode in discharged state contained 91.2% $PbSO_4$ and 4.6% $PbO_2$, while in the charged state it contained 3.2% $PbSO_4$ and 92.8% $PbO_2$. Therefore, the mass ratio of the lead sulfate and lead dioxide was in the range of 95.2% to 3.3% (in these calculations, the total mass of $PbSO_4$ and $PbO_2$ was taken as 100%). At 50%-discharge, the above ratio was 45.95%.

In discharged state, the porous electrodes and separator are soaked with electrolyte, an aqueous solution of sulfuric acid having density of 1.1 $g/cm^3$. Both electrodes are plate-shaped, with dimensions of 76×74 mm. The compression pressure on the electrodes and the separator between the case walls is 10 $kg/cm^2$. The electrolyte was hold only in the pores of the electrodes and the separator. The values of the electrolyte-free portions of the pore volume, measured by weighing, were 36% for the negative electrode, 21% for the positive electrode, and 11.5% for the separator.

During testing, the following values were obtained: maximum voltage 2.1 V; specific energy 56.2 Wh/l (for 0.5 A discharge current); number of charge-discharge cycles 6800 (the tests continued after this value was reached); internal resistance 5.8 mΩ; charging time 16 min; maximum extra gas pressure within the case 0.01 atm.

Example 2

Figure 2:
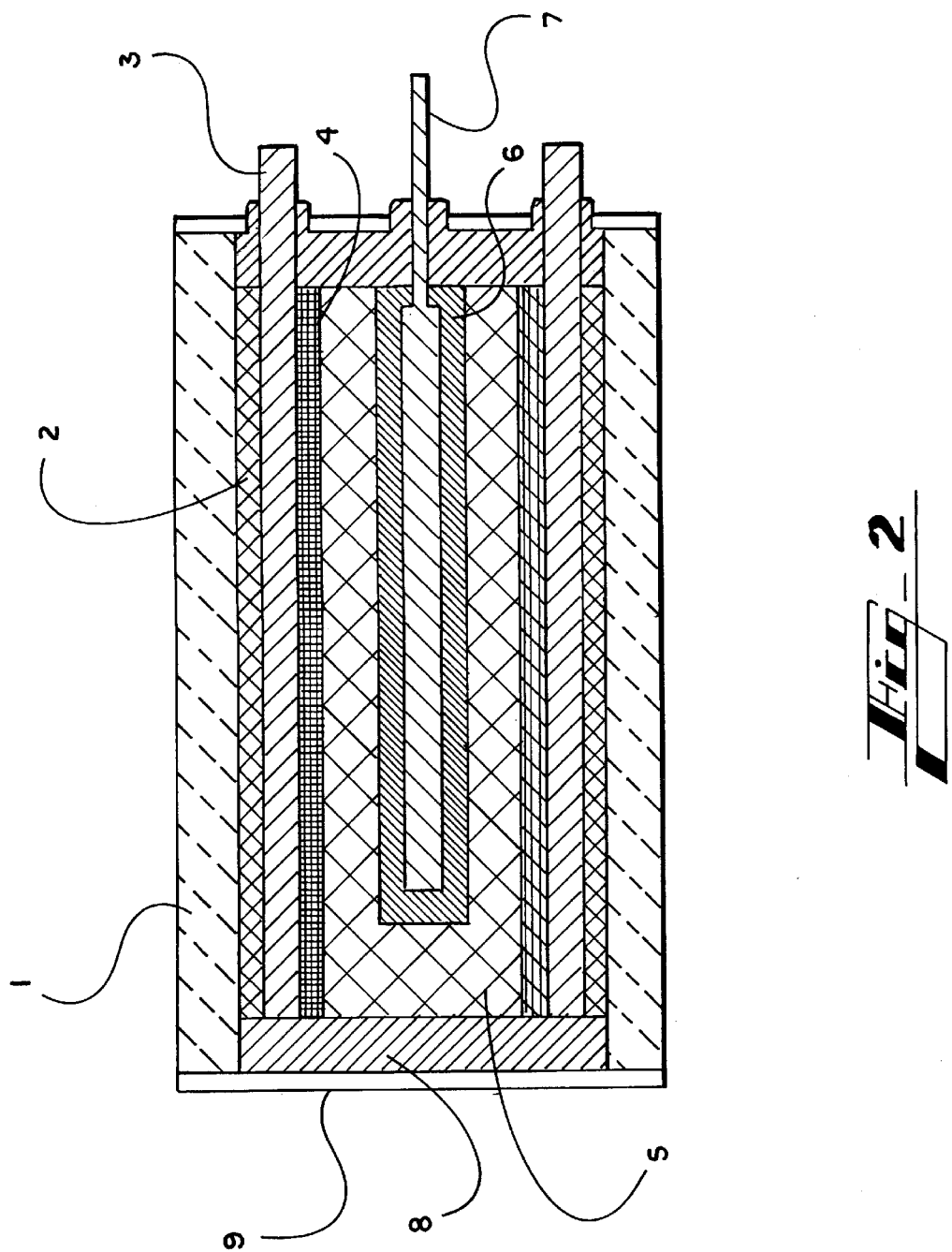
FIG. 2 represents another version of capacitor assembly according to the present invention.

An electric double layer capacitor (FIG. 2) differing from the capacitor described in Example 1 (FIG. 1) in that in this case, two negative electrodes were employed made each of 4 layers of TCA-type activated carbon fabric (with specific surface 1200 $m^2/g$ and layer thickness 300 μm), positioned on both sides of the positive electrode and interconnected. The positive nonpolarizable electrode 7 consisted of a grid made of an alloy containing 94% lead and 5% antimony. A paste consisting of 83% active mass and 17% polytetrafluorethylene was applied into the grid openings. According to the chemical analysis, the mass ratio of the lead sulfate and lead dioxide at assembly in discharged state was 95.8%. At fully charged state, the same ratio was 5.6%, and at 50% discharge—45.1% (in these calculations, the total mass of the $PbSO_4$ and $PbO_2$ was taken as 100%). A Grace-type separator 5 was employed. Current collectors 3 were made of sheet stainless steel. The current collectors corrosion-resistant protective layer 4 was made of non-porous, 0.3-mm thick graphite-based carbon material. Both electrodes were plate-shaped, with dimensions 76×74 mm. A sulfuric acid electrolyte with initial density 1.1 $g/cm^2$ (at discharged state of the capacitor) was used in this example. The compression pressure of 10 $kg/cm^2$ was employed on the electrodes. The electrolyte was contained only in the pores of the electrodes and the separator. The values of the electrolyte-free portions of the pore volume, measured by weighing, were 29% for the negative electrode, 19% for the positive electrode, and 10.5% for the separator.

FIG. 3 illustrates the dependence between the voltage (U) on the capacitor terminals and the potentials of the negative ($E_-$) and positive ($E_+$) electrode (vs. normal hydrogen electrode in the same solution) of the discharge time. The discharge curves shown were measured at temperature of 20° C. and current of 0.5 A.

Following conclusions could be made from the drawing described: 1) the potential of the positive electrode exhibits but insignificant decrease during the discharge process; 2) the potential of the negative electrode increases almost linearly during the process; 3) as a result, the discharge curve in the voltage range below 1.8 V is almost linear, which is characteristic of capacitors; 4) the maximum voltage ($U_{max}$) is approximately 2.1 V.

Since the oxidation rate of the carbon electrodes is considerable at potentials higher than 1 V, the minimum discharge voltage $U_{min}$ is achieved when $(E_-)_{max}$=1.0 V. In FIG. 3, one can see that for the capacitor in question, $U_{min}$=0.7 V.

The following results were obtained during testing: specific energy 58.9 W*hr/l (for 0.5 A discharge current); number of charge-discharge cycles 6800 (the tests continued after this value was reached); internal resistance, 5.1 mΩ; charging time 15 min.; maximum extra gas pressure within the case 0.008 atm.

The capacitor according to the present invention has a number of essential advantages over the capacitor described in WO 97/07518:

A considerably higher value of the maximum discharge voltage $U_{max}$=2.1 V, as compared to 1.4 V for the prototype. Due to the squared dependence of the capacitor power (W) from the voltage $$W=(C/2)[(U_{max})^2-(U_{min})^2] \quad (4),$$

where C is the capacitance, such a gain in voltage results in a substantially higher gain in specific energy.

Since the conductivity of the sulfuric acid electrolyte is much higher than that of the alkaline one, this results in an additional gain in the specific properties in comparison to the prototype.

The specific energy of the capacitor in accordance with the present invention as calculated from FIG. 3 is 58.9 Wh/l. The specific energy of the electrodes described in U.S. Pat. No. 4,313,084 and U.S. Pat. No. 4,562,511 does not exceed 2 Wh/l. The comparison between the two types of EDL capacitors clearly reveals that the specific energy of the EDL capacitor according to the present invention is several times higher than that of a conventional EDL capacitor assembled according to these prior art patents. This is due mainly to two reasons:

A substantially higher maximum voltage value $U_{max}$ for the capacitor according to the present invention as compared to the prior art electrodes; and The virtual independence of the positive electrode potential of the discharge time.

When compared with electrode described in Patent of Japan, Accepted Application No. 2-11008, the capacitor according to the present invention exhibited charge-discharge current as high as approximately 100 $mA/cm^2$ at sufficiently high specific capacitance, while the cycle life already reached is 6800 cycles. These values are considerably higher than the corresponding values for the capacitor according to the prior art.

The capacitor according to the present invention provides several advantages over the capacitors described in PCT/RU97/00353 and PCT/RU97/00411:

Addition of small amounts of lead to the polarizable electrode considerably increases its capacity and specific energy as a result of increase in the working surface of said electrode due to more pronounced hydrophilization of the carbon.

The capacitor according to the present invention is substantially (approximately by 30–60%) cheaper. This can be easily explained, keeping in mind that extended time and therefore large energy consumption is needed to obtain pure active compounds ($PbO_2$ or $PbSO_4$, as required according to the inventions PCT/RU97/00353 and PCT/RU97/00411, respectively). The present invention provides $PbO_2$, $PbSO_4$, and PbO as active components of the nonpolarizable electrode in its common case, which causes no deterioration in performance of the capacitor.

Addition of small amount of lead oxide (PbO) modifies the structure of the positive electrode minimizing the degradation of said electrode during cycling at moderate and high currents. Reversibility of both electrochemical reactions and changes in the pore structure are required for ideal performance of a capacitor during the charge-discharge process. In fact, the pore structure gradually degrades with the cycling. This leads to decrease in capacity of the electrode and in capacity and specific energy of the capacitor as a whole. Degradation processes are slowed down at not very low currents by addition of small amounts of PbO. As a result, the cycleability increases by 20–30%. At equal number of cycles, the specific energy rises.

Addition of small amount of lead phosphate, $Pb_3(PO_4)_2$, to the nonpolarizable electrode active mass diminishes the sulfatation and the guttering of the latter, thus increasing the cycleability of the capacitor by 20–50%.

Industrial Applications

A capacitor according to the present invention provides several times higher specific energy than the known EDL capacitor according to WO 97/07518 (58.9 Wh/l compared to 12.5 Wh/l) and costs approximately 10 times less. The capacitor according to the present invention allows series and parallel connections of elements and assembling of different combinations of capacitor batteries. This capacitor has an important advantage of being sealed and maintenance-free. The performance and properties of the capacitor are not affected by its position in space, i.e. whether it is positioned horizontally, vertically, etc. The capacitor according to the present invention is also expected to function normally when moving at high acceleration, such as in automobiles, aircraft, spacecraft, etc.

What is claimed is:

1. An electric double layer capacitor comprising: a polarizable electrode made of a carbon material, a non-polarizable electrode including lead dioxide and lead sulfate, a separator between the polarizable electrode and the non-polarizable electrode, and an aqueous solution electrolyte containing sulfuric acid, wherein the mass ratio of the lead sulfate to the lead dioxide ranges from about 0.1 to 99% to about 99 to 0.1%, and wherein the polarizable electrode also contains lead.

2. The capacitor of claim 1, wherein the portion of the lead in the polarizable electrode ranges from about 0.03 to about 3% by weight.

3. The capacitor of claim 1, wherein the non-polarizable electrode further contains lead monoxide in a mass amount of from about 0.2 to about 5% of the lead sulfate.

4. The capacitor of claim 1, wherein the non-polarizable electrode further contains lead phosphate in a mass amount of from about 0.1 to about 5% of the active mass of the electrode.

5. The capacitor of claim 1, wherein the polarizable electrode, the non-polarizable electrode, the separator and the aqueous solution electrolyte are enclosed in a case, wherein the polarizable electrode, the non-polarizable electrode and the separator are porous, and wherein the volume of the electrolyte in the case is lower than the total volume of the pores in the electrodes and the separator.

6. The capacitor of claim 5, wherein the electrolyte-free portion of pore volume in both electrodes and the separator is in from about 10% to about 50%.

7. The capacitor of claim 5, wherein the case has an internal space and the internal space is under vacuum.

8. The capacitor of claim 1, wherein the polarizable electrode, the non-polarizable electrode, the separator and the aqueous solution electrolyte comprise a single capacitor cell and at least one capacitor cell is compressed between case pressure covers of a case enclosing the at least one capacitor cell.

\* \* \* \* \*